Patented Mar. 10, 1931

1,796,026

UNITED STATES PATENT OFFICE

CHARLES V. IREDELL, OF EAST ORANGE, NEW JERSEY, ASSIGNOR TO WESTINGHOUSE LAMP COMPANY, A CORPORATION OF PENNSYLVANIA

RECOVERY OF TUNGSTEN FROM ORES

No Drawing.  Application filed May 28, 1929.  Serial No. 366,776.

This invention relates to the art of recovering metals from their ores and more particularly relates to the art of recovering tungsten from tungsten ores and crude concentrates, and has for its object the provision of a rapid and efficient method of effecting the complete separation of tungsten from alkaline solutions.

Another object of this invention is to provide a method of precipitating calcium tungstate substantially free from occluded impurities.

Another object of this invention is to facilitate the recovery of tungsten from tungsten ores or crude tungsten concentrates.

Other objects and advantages will become apparent as the invention is more fully disclosed.

Heretofore in the art it has been customary to recover the tungsten content of tungsten ores and crude concentrates by digesting the same with strong hot caustic alkali solutions, whereby the tungsten compounds are converted to water soluble alkali tungstate compounds. The strongly caustic aqueous solution of alkali tungstates is separated by filtration from the ore insolubles and concentrated by evaporation until crystallization of the alkali tungstate is effected.

Owing to the presence of the excess caustic alkali and to other solution impurities such as soluble silicates, aluminates, chromates and the like associated impurities, complete recovery of the alkali tungstates by crystallization methods may not readily be effected without also causing a separation of these impurities.

It is, therefore, customary to treat the strongly caustic mother liquors separated from the sodium tungstate crystals by different methods to recover the remaining tungsten compounds therein such as by running the alkaline mother liquor into hot hydrochloric acid effecting thereby a separation of tungstic acid, or by adding to the alkali solution a solution of calcium chloride, effecting thereby a separation of calcium tungstate compounds.

The first method of recovering the tungsten from the mother liquor is unsatisfactory in that the tungstic oxide is a very impure dirty greenish precipitate difficult to recover from the solution and relatively high losses of the tungsten as soluble or colloidal particles are experienced.

The second method is to be preferred as the tungsten content of the alkaline solution is completely precipitated as calcium tungstate. The objection to this method of recovering the tungsten is that large volumes of calcium oxides or hydroxides are also precipitated with the calcium tungstate resulting in the obtaining of a slowly settling and difficultly filterable precipitate. In addition when the precipitate is subsequently treated with acid to recover the tungsten content the excess calcium oxide requires a relatively large amount of acid to neutralize.

I have found that under certain solution conditions a crystalline type of calcium tungstate may be precipitated from alkaline solutions of sodium tungstate, which precipitate is substantially free from occluded associated solution impurities and from calcium hydroxide, and which, moreover, is readily separable from the solution by settling, filtering and the like methods.

I obtain this coarsely crystalline type of precipitate by effecting the precipitation of the calcium tungstate from the solution within certain limits of solution alkalinity. The mother liquor from the drained sodium tungstate crystals, is placed in a large stoneware precipitating tank, and the solution diluted with water until the concentration of the sodium tungstate is approximately 120 to 150 grams per liter. I have found that the precipitate of calcium tungstate obtained with this approximate concentration most convenient to handle on a commercial scale, as the subsequent washing of the precipitate by decantation is facilitated when the bulk of precipitate is not too great. Other concentrations of tungstic oxide in solution may be used, however, if desired without substantially departing from the nature of my invention.

To this solution a solution of dilute hydrochloric acid (HCl) is added, slowly and with constant stirring until the solution is still faintly alkaline with respect to phenolphthalein. I prefer an alkalinity of from 0.3% to 0.7% using phenolphthalein as an indicator. With an alkalinity lower than 0.3% the tungsten is incompletely precipitated from the solution as calcium tungstate. With an alkalinity higher than 0.7% a slowly settling bulky precipitate containing large amounts of occluded impurities and associated calcium oxide is obtained which is exceedingly difficult to filter and to wash. The exact alkalinity of the solution within these prescribed limits may be varied depending somewhat upon the concentration of the sodium tungstate in solution or the extent of dilution of the same. I have found, however, that when the solution is neutralized to within this prescribed degree of alkalinity and calcium tungstate percipitated therefrom by the addition to the solution of a solution of an inorganic calcium salt such as the chloride, or nitrate, that the resultant calcium tungstate precipitate is crystalline and not amorphous as is usually obtained.

The extent of dilution or the concentration of the sodium tungstate in solution is regulated for the purpose of facilitating the commercial application of the process. The specific calcium tungstate formed by this method of precipitation according to chemical analyses that I have made is believed to be the mono-hydrate having the formula.

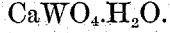

$$CaWO_4 \cdot H_2O.$$

Subsequent to washing, filtering and drying the dried dehydrated calcium tungstate will be found to be extremely finely divided, uniform in particle size and to have a high degree of purity. This form and type of calcium tungstate is useful in the arts as an inert pigment for dead white surfaces such as on X-ray screens, projection screens, or screens for cathode ray oscillographs and the like. If desired suitable phosphorescent impurities may be added thereto. To recover the tungsten content of the precipitate the calcium tungstate may be digested with hot concentrated hydrochloric acid, whereby the usual orange colored tungstic acid is formed.

As a specific embodiment of the practice of my invention I take the alkaline mother liquor from the sodium tungstate crystallization and dilute the same until a sodium tungstate content of approximately 120 to 150 grams per liter is obtained. The caustic alaki content of such a solution will vary widely depending upon the prior history of the solution, such as whether tungsten ores or crude tungsten concentrated had been subjected to digestion, the original tungstic acid content of the material digested, amount of impurities and the like factors. It is customary, however, to have present in such a solution from 200 to 260 grams of sodium hydroxide per liter.

Approximately 58 liters of this solution is placed in a 37 gallon stoneware kettle and agitated with air. A solution of hydrochloric acid (approximately 33% acid) is then run into the kettle slowly and in a fine stream, such as through a 1/8″ orifice from a 12″ to 24″ head, until the alkalinity of the solution is reduced to between 0.3 per cent and 0.7 per cent using phenolphthalein as an indicator.

Calcium chloride solution having a specific gravity of approximately 1.175 is then added slowly to the agitated solution in a fine stream until no further precipitate is formed. The solution should be slightly warm during this precipitation as this facilitates the formation of the crystalline calcium tungstate. I have found that the heat of reaction during the neutralization of the caustic alkali by the hydrochloric acid, raises the temperature of the solution sufficiently so that if the calcium chloride solution is immediately added following neutralization, that the resulting calcium tungstate precipitate is satisfactory without applying additional heat to the solution.

The calcium tungstate precipitate is allowed to settle and washed several times with water by decantation, collected on a filter and dried. The wash waters may be cold or relatively cold if desired.

The dried precipitate may be treated to remove the tungsten content thereof by digestion with hot hydrochloric acid, the insoluble tungstic acid being recovered after thorough washing in any desired manner.

Although the specific embodiment discloses the application of the present invention with respect to the recovery of tungsten from alkali mother liquors remaining following crystallization of a portion of the sodium tungstate content, it is apparent that I may eliminate the crystallization step if desired and treat the caustic alkali solution obtained from the alkali digestion or fusion of the ore or crude concentrates to effect the precipitation of the calcium tungstate therefrom within the limiting degrees of solution alkalinity disclosed above, if so desired, in the manner disclosed in my specific embodiment. Such variations and applications of the present invention that may be made are contemplated as fall within the scope of the following claims.

What is claimed is:

1. The method of separating tungsten from alkaline solutions which comprises reducing the alkalinity of said solution to between 0.3 to 0.7 per cent free alkali, using phenolphthalein as an indicator, and thereafter adding to the solution a soluble calcium salt in amounts sufficient to effect precipitation of the tungsten content of the solution, subsequently recovering the precipitated calcium tungstate compound in any desired manner.

2. The method of separating calcium tungstate in a crystalline mono-hydrated form which comprises forming an alkaline solution of a tungsten compound, adjusting the alkalinity of said solution to not exceed 0.7 per cent and not under 0.3 per cent using phenolphthalein as an indicator, and thereafter adding to the solution a water soluble calcium salt, recovering the precipitated tungstate compound in any convenient manner.

3. The method of precipitating a mono-hydrated crystalline calcium tungstate which comprises adding calcium chloride to a warm slightly alkaline solution, the alkalinity of said solution being between 0.3 per cent and 0.7 per cent using phenolphthalein as an indicator.

4. The method of effecting the separation of a mono-hydrated calcium tungstate compound which comprises effecting a precipitation of said tungstate compound from slightly alkaline aqueous solutions of alkali tungstate, the alkalinity of said solution approximating 0.3 per cent to 0.7 per cent using phenolphthalein as an indicator.

5. The method of recovering tungsten from tungsten ores and crude concentrates which comprises digesting said ore with hot concentrated caustic alkali solution, separating the solution from insoluble material, reducing the alkalinity of the solution to approximately 0.3 per cent to 0.7 per cent using phenolphthalein as an indicator, adding to the solution calcium chloride in sufficient amounts to precipitate the tungsten content thereof, and thereafter recovering the precipitated calcium tungstate from the solution in any well known manner.

6. The method of recovering tungsten from tungsten ores and crude concentrates which comprises converting the tungsten content thereof to water soluble alkali tungstate compounds, forming an alkaline aqueous solution of said compounds, neutralizing said solution to within 0.3 to 0.7 per cent alkalinity using phenolphthalein as an indicator, adding to the neutralized solution an aqueous solution of calcium chloride in sufficient amounts to effect complete precipitation of the tungsten content of the solution, recovering the precipitated calcium tungstate in any convenient manner and thereafter recovering the tungsten content thereof by digestion in hydrochloric acid.

7. The method of recovering tungsten from tungsten ores and crude tungsten concentrates which comprises digesting the material with hot strongly caustic alkaline solution, separating the solution from insoluble material, concentrating the filtrate by heat to effect at least a partial crystallization of the alkali tungstates in solution, separating the mother liquor from the crystals of alkali tungstates, diluting the solution to contain approximately 150 grams of sodium tungstate per liter, neutralizing the solution to between 0.3 to 0.7 per cent alkalinity, using phenolphthalein as an indicator, adding to the neutralized solution a solution of calcium chloride to effect entire precipitation of the tungsten therefrom, and collecting the precipitate in any desirable manner.

8. In the preparation of calcium tungstate by precipitation from a caustic alkaline solution of alkali tungstate, the method of effecting such precipitation from solutions having an alkalinity of not less than 0.3 per cent and not greater than 0.7 per cent using phenolphthalein as an indicator.

9. As an article of manufacture a mono-hydrated calcium tungstate compound having the formula $CaWO_4 \cdot H_2O$.

10. As an article of manufacture a crystalline calcium tungstate having the empirical formula $CaWO_4 \cdot H_2O$.

In testimony whereof, I have hereunto subscribed my name this 25th day of May, 1929.

CHARLES V. IREDELL.